United States Patent
Snyder (10) Patent No.: US 7,818,745 B2
(45) Date of Patent: Oct. 19, 2010

(54) DYNAMIC TRANSACTION CONTROL WITHIN A HOST TRANSACTION PROCESSING SYSTEM

(75) Inventor: Paul Snyder, Mechanicsburg, PA (US)

(73) Assignee: International Business Machines Corporation, Armonk, NY (US)

( * ) Notice: Subject to any disclaimer, the term of this patent is extended or adjusted under 35 U.S.C. 154(b) by 1593 days.

(21) Appl. No.: 10/671,890

(22) Filed: Sep. 29, 2003

(65) Prior Publication Data

US 2005/0071307 A1     Mar. 31, 2005

(51) Int. Cl.
G06F 9/46       (2006.01)
G06F 11/00      (2006.01)
G06F 7/00       (2006.01)

(52) U.S. Cl. .................. 718/101; 718/100; 718/104; 718/105; 714/25; 714/37; 714/47; 707/607; 707/703

(58) Field of Classification Search ............. 718/100, 718/101, 102, 103, 104, 105, 106, 107, 108, 718/1; 714/25, 26, 37, 47, 39, 51, 56; 707/607, 707/703

See application file for complete search history.

(56) References Cited

U.S. PATENT DOCUMENTS 5,581,749 A    12/1996    Hossain et al.

(Continued)

FOREIGN PATENT DOCUMENTS

JP         2921458         7/1999

(Continued)

OTHER PUBLICATIONS

Pazel, D. P. et al, "Neptune: A Dynamic Resource Allocation and Planning System for a Cluster Computing Utility", Cluster Copmuting and the Grid 2nd IEEE/ACM International Symposium, CCGRID2002 Berlin, Germany, May 21-24, 2002, Piscataway, NJ, USA, IEEE Comput. Soc,. US, May 21, 2002, pp. 57-64.

(Continued)

*Primary Examiner*—Meng-Ai An
*Assistant Examiner*—Abdullah Al Kawsar
(74) *Attorney, Agent, or Firm*—William Schiesser; Roberts Mlotkowski Safran & Cole (57) ABSTRACT

A method and system is provided to dynamically adjust system administration criteria based upon current conditions of a transaction processing system. Granular autonomic administrative action relative to varying conditions results in more flexible response to particular system or transactional conditions. As certain criteria are met, at a system level, a transactional level, or a combination, appropriate action may be taken suitable to the particular condition encountered. A response more suited to a particular granular condition, provides for more focused event handling on a case by case basis rather than on a system-wide or undesired transient conditions. As a result, more efficient use of system resources occurs along with more reliable management of transactional processing.

42 Claims, 7 Drawing Sheets

U.S. PATENT DOCUMENTS

| | | | |
|---|---|---|---|
| 5,764,972 | A | 6/1998 | Crouse et al. |
| 5,855,020 | A | 12/1998 | Kirsch |
| 6,256,634 | B1 | 7/2001 | Moshaiov et al. |
| 6,269,370 | B1 | 7/2001 | Kirsch |
| 6,321,263 | B1* | 11/2001 | Luzzi et al. ............... 709/224 |
| 6,446,091 | B1 | 9/2002 | Noren et al. |
| 6,553,392 | B1 | 4/2003 | Mosher, Jr. et al. |
| 6,556,989 | B1 | 4/2003 | Naimark et al. |
| 6,571,213 | B1 | 5/2003 | Altendahl et al. |
| 6,574,605 | B1* | 6/2003 | Sanders et al. ............... 705/8 |
| 6,671,686 | B2* | 12/2003 | Pardon et al. ............... 707/8 |
| 6,738,933 | B2* | 5/2004 | Fraenkel et al. ............... 714/47 |
| 6,760,684 | B1* | 7/2004 | Yang et al. ............... 702/182 |
| 6,801,940 | B1* | 10/2004 | Moran et al. ............... 709/224 |
| 7,197,559 | B2* | 3/2007 | Goldstein et al. ............ 709/224 |
| 7,379,999 | B1* | 5/2008 | Zhou et al. ............... 709/224 |
| 2001/0034737 | A1 | 10/2001 | Cane et al. |
| 2002/0062237 | A1* | 5/2002 | Matsumoto et al. ............ 705/7 |
| 2002/0099818 | A1* | 7/2002 | Russell et al. ............... 709/224 |
| 2002/0161604 | A1 | 10/2002 | Kardos et al. |
| 2002/0194244 | A1* | 12/2002 | Raventos ............... 709/101 |
| 2003/0002503 | A1 | 1/2003 | Brewer et al. |
| 2003/0041059 | A1 | 2/2003 | Lepien |
| 2003/0061265 | A1* | 3/2003 | Maso et al. ............... 709/105 |
| 2003/0065577 | A1 | 4/2003 | Haynes |
| 2003/0135609 | A1* | 7/2003 | Carlson et al. ............... 709/224 |
| 2004/0039550 | A1* | 2/2004 | Myers ............... 702/186 |
| 2004/0153777 | A1* | 8/2004 | Sugimoto et al. ............ 714/25 |
| 2005/0125798 | A1* | 6/2005 | Peterson ............... 718/105 |

FOREIGN PATENT DOCUMENTS

| | | | |
|---|---|---|---|
| JP | PUPA 2002-351852 | | 12/2002 |
| WO | WO 03/071424 A2 | | 8/2003 |

OTHER PUBLICATIONS

Riedl, R. et al, "Classification of Load Distribution Algorithms", Parallel and Distributed Processing, 1996, Proceedings of the Fourth Euromicro Workshop on Braga, Portuga,I Jan. 24-26, 1996, Los Alamitos, CA, USA, IEEE Comput. Soc, US, Jan. 24, 1996, pp. 404-413.

Mittal, V. et al: "An Expert System Based Load Monitoring and Scheduling System for Load Balancing in Distributed Systems", Intelligent Control, 1988, Proceedings., IEEE International Symposium on Arlington, VA, USA. Aug. 24-26, 1988, Washington, D.C., USA, IEEE Comput. Soc. PR, US, pp. 215-220.

Gray, Jim, "Transaction Processing: Concepts and Techniques", 1993, Morgan Kaufmann Publishers, Inc., pp. 294, 347-349.

* cited by examiner

DYNAMIC TRANSACTION CONTROL WITHIN A HOST TRANSACTION PROCESSING SYSTEM

BACKGROUND OF THE INVENTION

1. Field of the Invention

This invention relates to transaction processing systems, and more particularly, to autonomic control and administration of individual transactions or groups of transactions based upon their unique current resource usage characteristics relative to the present status of one or more present characteristics of the transaction processing system or the host computer system.

2. Background Description

Transaction processing systems serve as a basis for electronic commerce. In electronic commerce two or more entities electronically process specific tasks related to commerce ranging from purchase and payment to banking transactions. Examples of electronic commerce include purchase and payment transactions using credit and debit cards, paying bills online and the handling of return merchandise credits. Transaction processing systems also facilitate the accessing of data across a network, such as the Internet. Browsing merchandise on a vendor's website, obtaining stock quotes from a financial service institution's website and checking sporting event scores at a news website are examples of such accesses. Other examples of routine network transaction events include the interchange of data that occurs during online gaming, downloading product updates from a software vendor's server and the exchange of email.

Prior to the days of the Internet, an example of a transaction processing system would be a given corporation's internal users accessing a host mainframe processor, with individual transactions being serviced via an executing software "transaction monitor", such as, for example, IBM's CICS (Customer Information Control System). With the advent of the Internet, an example of a transaction processing system includes the server or servers that host a given Internet website, along with the underlying hardware and software infrastructure, frequently including an "application server" such as IBM's WebSphere Application Server.

Transactions that are serviced by a transaction processing system may come from any number of sources, examples of which include users accessing the system from a home or office personal computer, personal digital assistant (PDA), network-enabled cellular devices and automated teller machines (ATM's). Additionally, transaction processing systems may also be accessed by other systems, such as partner transaction processing systems, interactive voice response systems, or any other automated entity that has access to the transaction processing system through a network.

For a variety of reasons such as application errors, hardware faults and unintended use of the transaction processing system, there is a chance that a transaction or group of transactions may take on characteristics that are outside of the design specifications of the transaction processing system. Actions commonly taken to eliminate the undesirable workload from the system could range from purging the transaction to shutting down and restarting the entire transaction processing environment.

In other cases it may simply become desirable to favor one type of work versus another type based upon current general system conditions, such as high utilization or the like. Current practice facilitates the remediation of these conditions through binary evaluation. For example, if a given transaction on a transaction processing system has consumed more than a predetermined number of CPU seconds, then the offending transaction is terminated. A termination of an offending transaction may also occur, for example, if a given transaction were consuming more than some predetermined amount of electronic storage.

Current practice also allows for indiscriminate termination of transactions in the event of an alert on the transaction processing system. An example of the type of condition that would trigger such an alert is when a short on storage event occurs within the transaction processing system.

A shortcoming of the current practices arise from the indiscriminate nature of transaction administration. In practice, transaction processing systems purge transactions that exceed some arbitrary limit, without regard to whether the limit that was exceeded is presently constrained on the transaction processing system.

A further shortcoming is when remedial action is taken or initiated to address an alert from the transaction processing system, but the nature of the action is poorly targeted and/or overly drastic, affecting transactions that have little or no bearing on the alert, itself. Currently in transaction control facilities, autonomic corrective action is typically ill-targeted, poorly timed, and affects the user community too broadly.

SUMMARY OF THE INVENTION

In an aspect of the invention, a method is provided for managing a transaction processing system. The method comprises defining at least one criterion which is at least a workload characteristic and defining at least one threshold metric for each of the at least one criterion. The method further comprises defining at least one trigger action in response to the at least one threshold metric and performing the at least one trigger action in response to the at least one threshold metric being met.

In another aspect of the invention, a method is provided for managing a system. The system comprises the steps of determining current conditions of a workload characteristic, evaluating the current conditions of the workload characteristic and dynamically adjusting system administration criteria based on a threshold metric associated with the current conditions of the workload characteristic.

In another aspect of the invention, a system is provided for managing a transaction processing system. The system comprises a means for defining at least one criterion, wherein the at least one criterion is a workload characteristic of the transaction processing system and a means for defining at least one threshold metric for each of the at least one criterion. The system further comprises a means for defining at least one trigger action in response to the at least one threshold metric.

In another aspect of the invention, a system is provided for managing a transaction processing system. The system comprises a means for determining current conditions of at least a workload characteristic, a means for evaluating the current conditions of at least the workload characteristic and a means for dynamically adjusting system administration criteria based on a threshold metric associated with the current conditions of at least the workload characteristic.

In another aspect of the invention, a computer program product is provided comprising a computer usable medium having readable program code embodied in the medium. The computer program product includes a first computer code to define at least one criterion, wherein the at least one criterion is a workload characteristic of the transaction processing system and a second computer code to define at least one threshold metric for each of the at least one criterion. Further included are a third computer code to define at least one trigger action in response to the at least one threshold metric and a fourth computer code to perform the at least one trigger action in response to the at least one threshold metric being met.

DETAILED DESCRIPTION OF EMBODIMENTS OF THE INVENTION

In the system and method of the invention, an autonomic extension of a transaction processing system dynamically adjusts system administration criteria based upon the current conditions of the transaction processing system. The invention provides for the ability of system designers and administrators to apply greater autonomic logic to the governance of a transaction processing system. The invention also allows for very granular autonomic administrative action relative to varying conditions within the transaction processing system as well as a host of other advantages as discussed herein. System designers and administrators are enabled to take into consideration fluctuating conditions throughout the server/system when developing autonomic control models.

Figure 1:
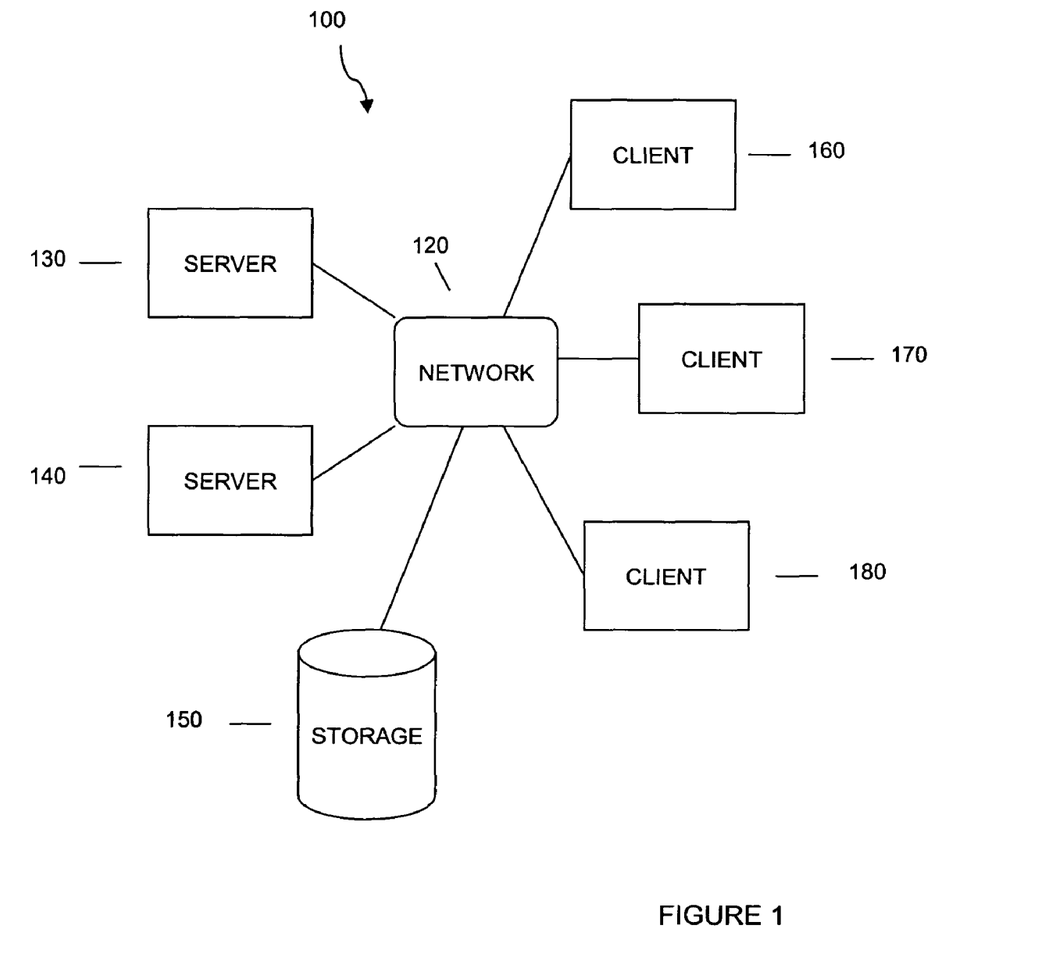
FIG. 1 is a block diagram illustrating a typical distributed data processing system in which the present invention may be implemented.

FIG. 1 is a block diagram illustrating a typical distributed data processing system in which the invention may be implemented. The distributed data processing system 100 comprises a number of computers, connected by a network 120. In one implementation, server computer 130 is connected to the network 120 along with a storage unit 150 and client computers 160, 170 and 180. In the depicted example, distributed data processing system 100 may be the Internet, with the network 120 representing a world-wide collection of networks and gateways that use the transmission control protocol over internet protocol (TCP/IP) suite of protocols to communicate with one another. An embodiment of this invention may involve server 130 to server 140 interactions, or storage to storage interactions.

The invention may be divided into four recurring stages: (1) obtain system level metrics, (2) obtain transaction level metrics, (3) perform evaluations, and (4) perform action based on the evaluations. Restated, as a processing cycle begins, the invention gathers salient details regarding the state of the transaction processing system and related environment, i.e., the system level metrics. The second stage of processing involves the collection of details or metrics regarding individual executing transactions, i.e., transactional level metrics. The third stage of processing performs evaluations which are defined in the interval criterion tables, which may result in stage four, which includes performing an administrative action. Embodiments of the invention are referenced herein as "facility" or "the facility" and may be a software extension of a transaction processing system.

In embodiments, the components to support the four stages may include: (i) a component to collect system and transaction information that is germane to an administrator's decision making process, (ii) a component to perform complex evaluations between the collected data and the invention's configuration data, and (iii) a component to execute an action that is germane to an administrator's functions. (See discussion, for example, of FIGS. 2A-2E).

The invention also includes implementation of an interval criterion matrix and it typically may be a source of configurable data used by the invention and may be created by an administrator or accessed from a pre-built electronic source. An example of the interval criterion matrix is shown in Table 1 and is described in further detail below with reference to FIGS. 2A-2E.

TABLE 1

Example Interval Criterion Matrix

| | (601) System Level Metric | (602) Transaction Identifier | (603) Transaction Level Metric | (604) Facility Action |
|---|---|---|---|---|
| 1 | Average System Processor Utilization is in the 50%-75% range | AA* | Transaction Processor Utilization is greater than 30 Seconds | Reduce Priority of Transaction |
| 2 | Average System Processor Utilization is in the 50%-75% range | AA* | Transaction Processor Utilization is greater than 45 Seconds | Reduce Priority of Transaction & Quiesce Transaction for 10 Seconds |
| 3 | Average System Processor Utilization is in the 50%-75% range | AA* | Transaction Processor Utilization is greater than 60 seconds | Terminate Transaction |
| 4 | Average System Processor Utilization is in the 75%-99% range | AA* | Transaction Processor Utilization is greater than 10 Seconds | Reduce Priority of Transaction |
| 5 | Average System Processor Utilization is in the 75%-99% range | AA* | Transaction Processor Utilization is greater than 15 Seconds | Reduce Priority of Transaction & Quiesce Transaction for 10 Seconds |
| 6 | Average System Processor Utilization is in the 75%-99% range | AA* | Transaction Processor Utilization is greater than 20 Seconds | Terminate Transaction |

TABLE 1-continued

Example Interval Criterion Matrix

| | (601) System Level Metric | (602) Transaction Identifier | (603) Transaction Level Metric | (604) Facility Action |
|---|---|---|---|---|
| 7 | Average System Processor Utilization is 100% | AA* | Transaction Processor Utilization is greater than 2 Seconds | Reduce Priority of Transaction |
| 8 | Average System Processor Utilization is 100% | AA* | Transaction Processor Utilization is greater than 4 Seconds | Reduce Priority of Transaction & Quiesce Transaction for 10 Seconds |
| | Average System Processor Utilization is 100% | AA* | Transaction Processor Utilization is greater than 6 Seconds | Terminate Transaction |

The configuration data shown in Table 1 comprises a matrix that includes a "System Level Metric" 601. The system level metric may be a single or progressive variable (e.g., ranges) relative to a measurement of an aspect of the transaction processing system. The matrix of Table 1 further includes a "Transaction Identifier" 602 which may, for example, provide selection criteria for a single transaction or plurality of transactions. Table 1 further includes a "Transaction Level Metric" 603 and a "Facility Action" 604. The Transaction Level Metric 603 may be a single or progressive variable relative to an aspect of the included transaction, and the Facility Action 604 may be, for example, a reference to an action to occur should the variable evaluation result be positive. In embodiments, system-level criterion (e.g., 601 and 604) may be in a separate table.

By way of example, using the data of Table 1, when the System Level Metric has an average system processor utilization in the range of 50%-75%, and the Transaction Level Metric 603 is greater than 30 seconds, the Facility Action 604 may reduce the priority of a current transaction. Of course, it should be understood that other scenarios may also be implemented by the invention as discussed herein and as now should be understood by those skilled in the art. Now as it should be understood, within the overall process of the invention, various system-level metrics of the transaction processing system and the supporting hardware, software and networking environment are sampled. Examples of such system-level metrics may include but not limited to, processor utilization, memory utilization, storage utilization, load upon the input/output subsystem(s) and load upon the network interfaces. In embodiments, a list of salient metrics to be collected and a reference to a logical process that performs collection of each of these metrics, exists on an interval criterion data source (e.g., a database).

Also within the overall process a method is provided for gathering details of each transaction executing on the transaction processing system at a point in time. As with the system-level metrics, this method accesses a list of salient metrics to be collected and a reference to a logical process that performs collection of each of these metrics from the interval criterion data source. The invention processes through each individual transaction in some order, which may be a sequential order.

As transaction-level metrics become available, thresholds that may be stored in the interval criterion matrix are evaluated. A feature of the invention includes the incremental nature of both the system-level and transaction-level metrics. For example, system-level processor utilization levels of 30%, 40%, 50% and 60% may all have differing thresholds on the transaction-level side of the metric's evaluation. Furthering the example, transaction-level processor utilization of 10 CPU seconds may be considered excessive at 50% system-level processor utilization, transaction-level processor utilization of 8 CPU seconds may be considered excessive at 60% system-level processor utilization.

When both a system-level and transaction-level evaluation result in a "true" result for a given interval criterion entry, the invention invokes the action specified in the same interval criterion entry. Again, as with other logic points indicated by the interval criterion matrix, in embodiments, the action is stored in the interval criterion data source as a reference to a logical process that performs said action.

Figure 2A:
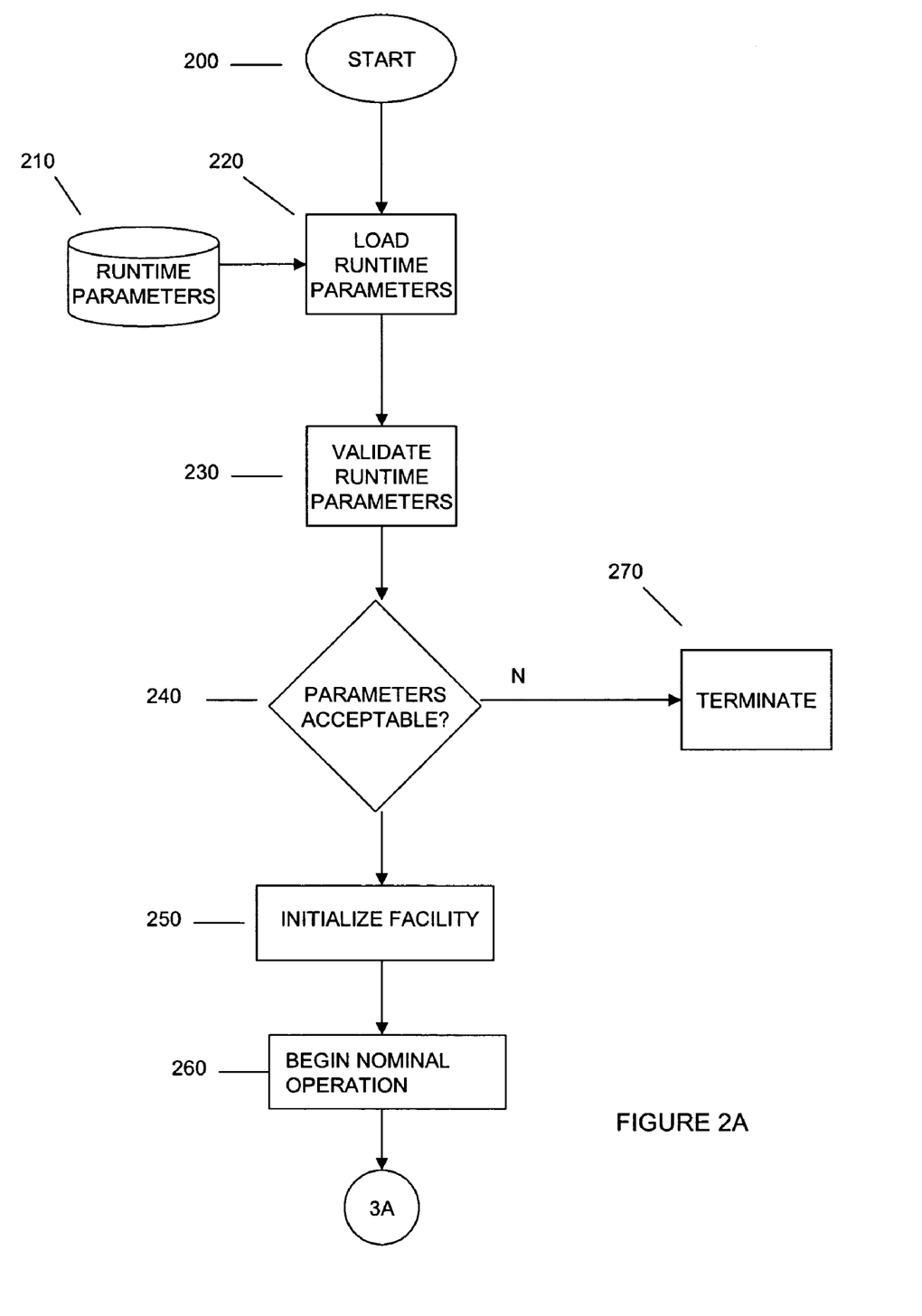
FIGS. 2A-2E are flow diagrams of an embodiment showing steps of using the invention.
Figure 2B:
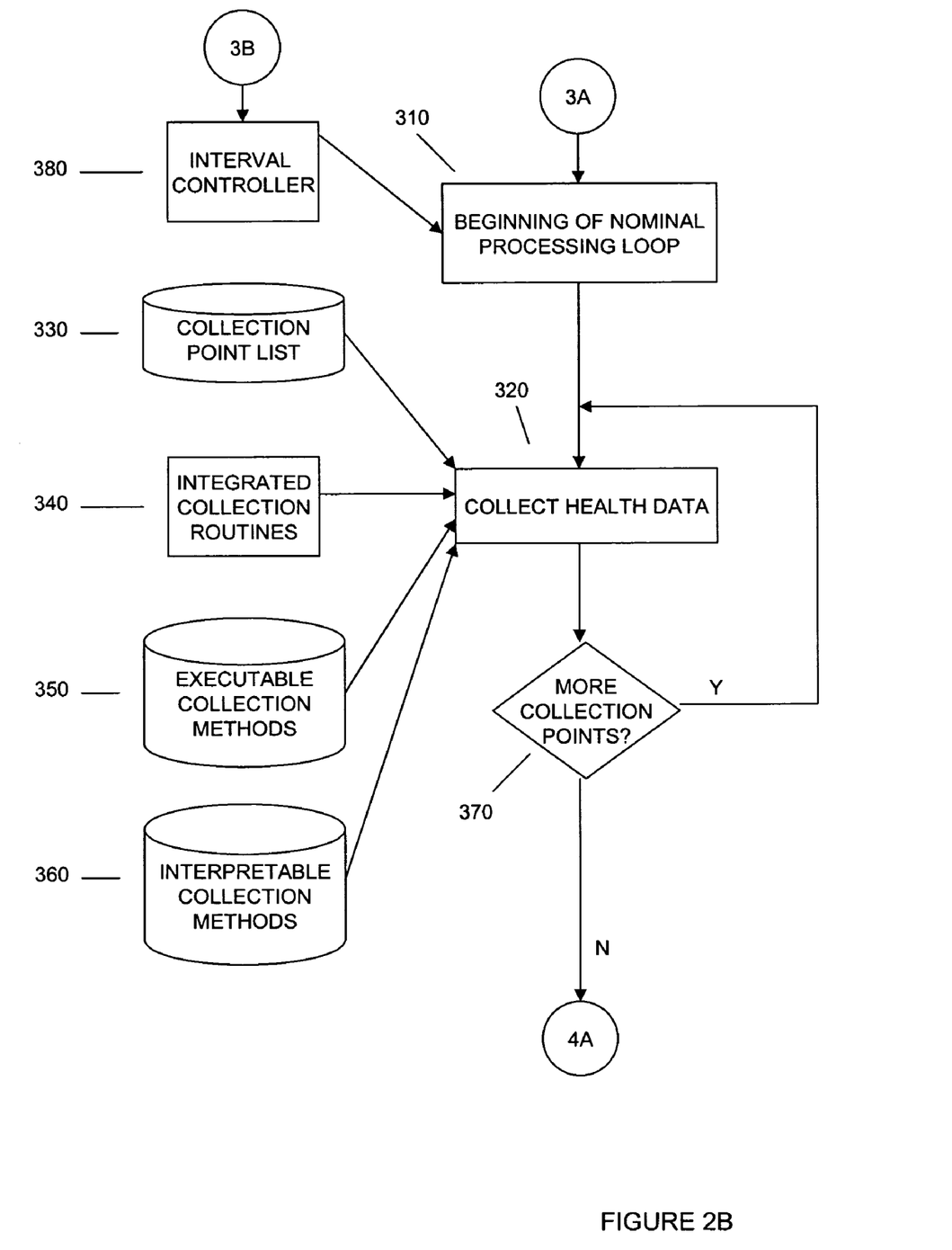
Figure 2C:
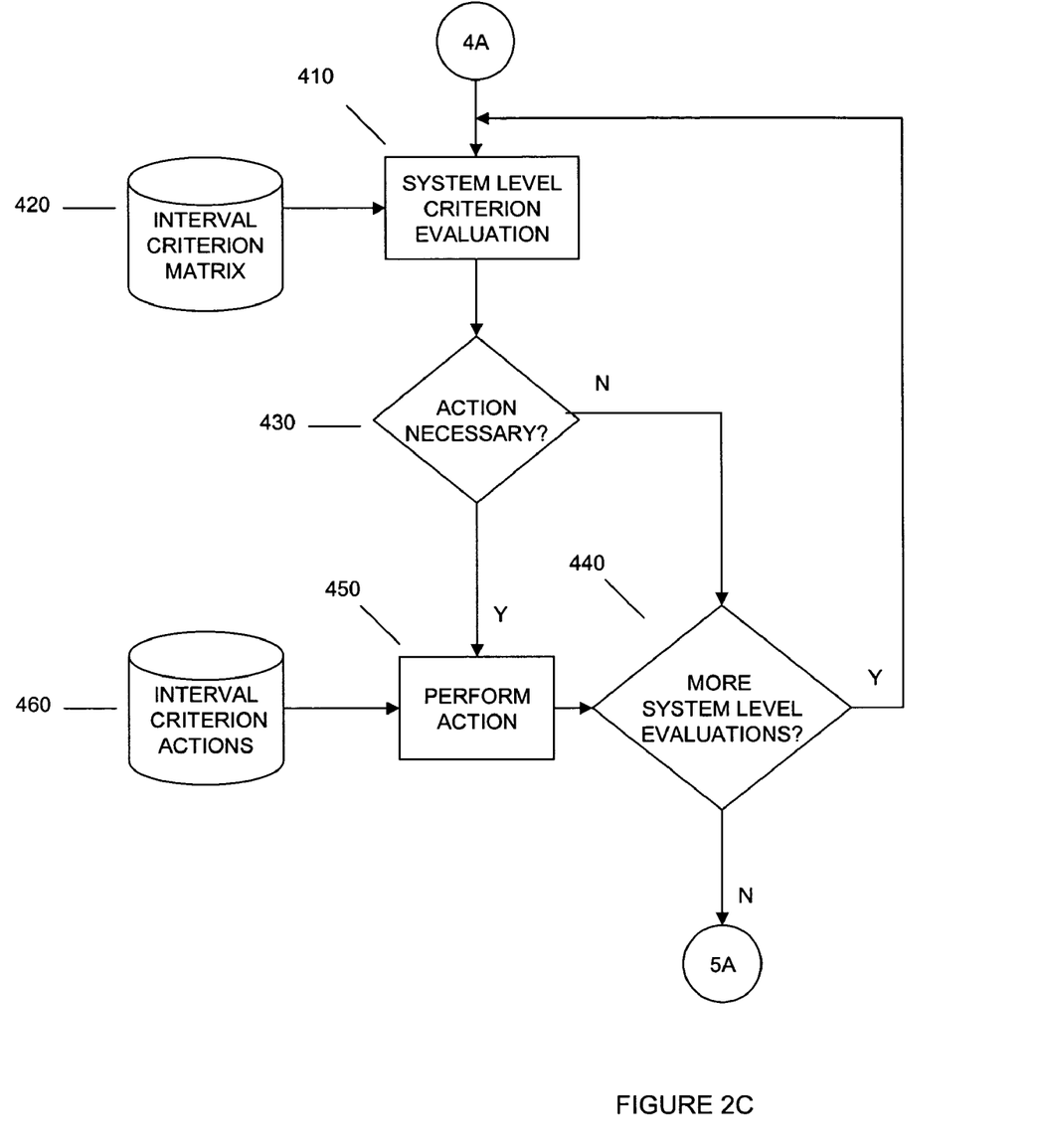
Figure 2D:
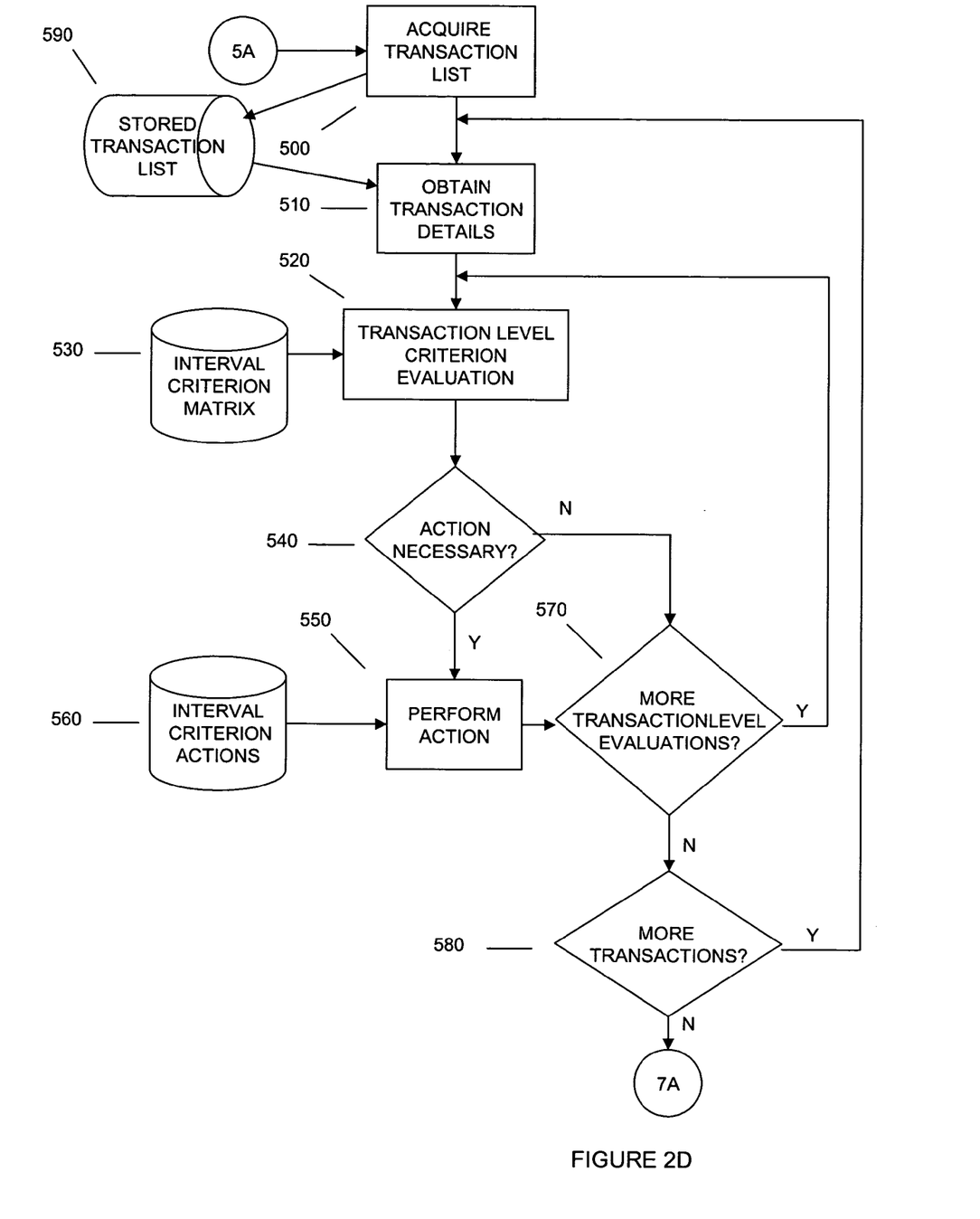
Figure 2E:
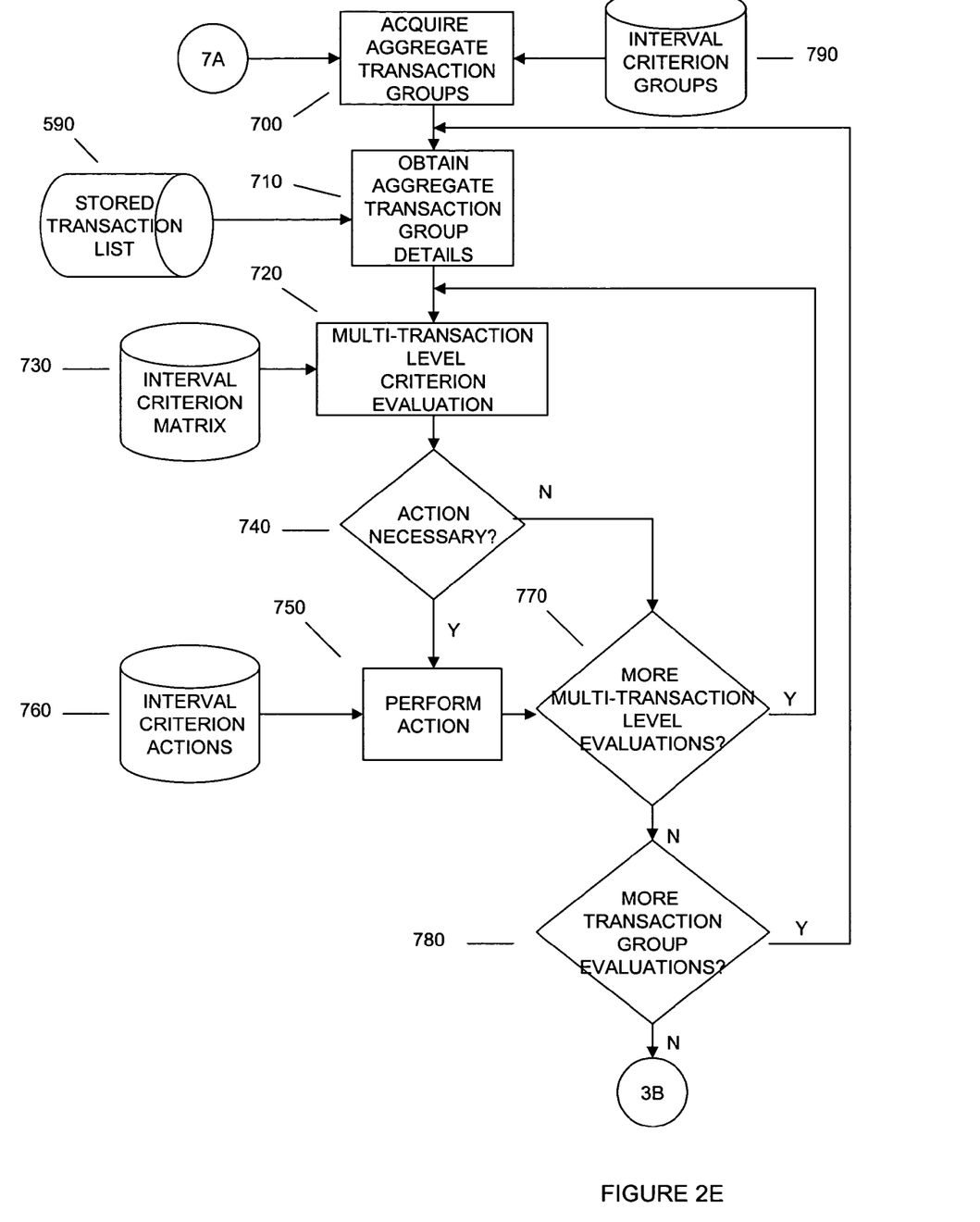
Figure 3:
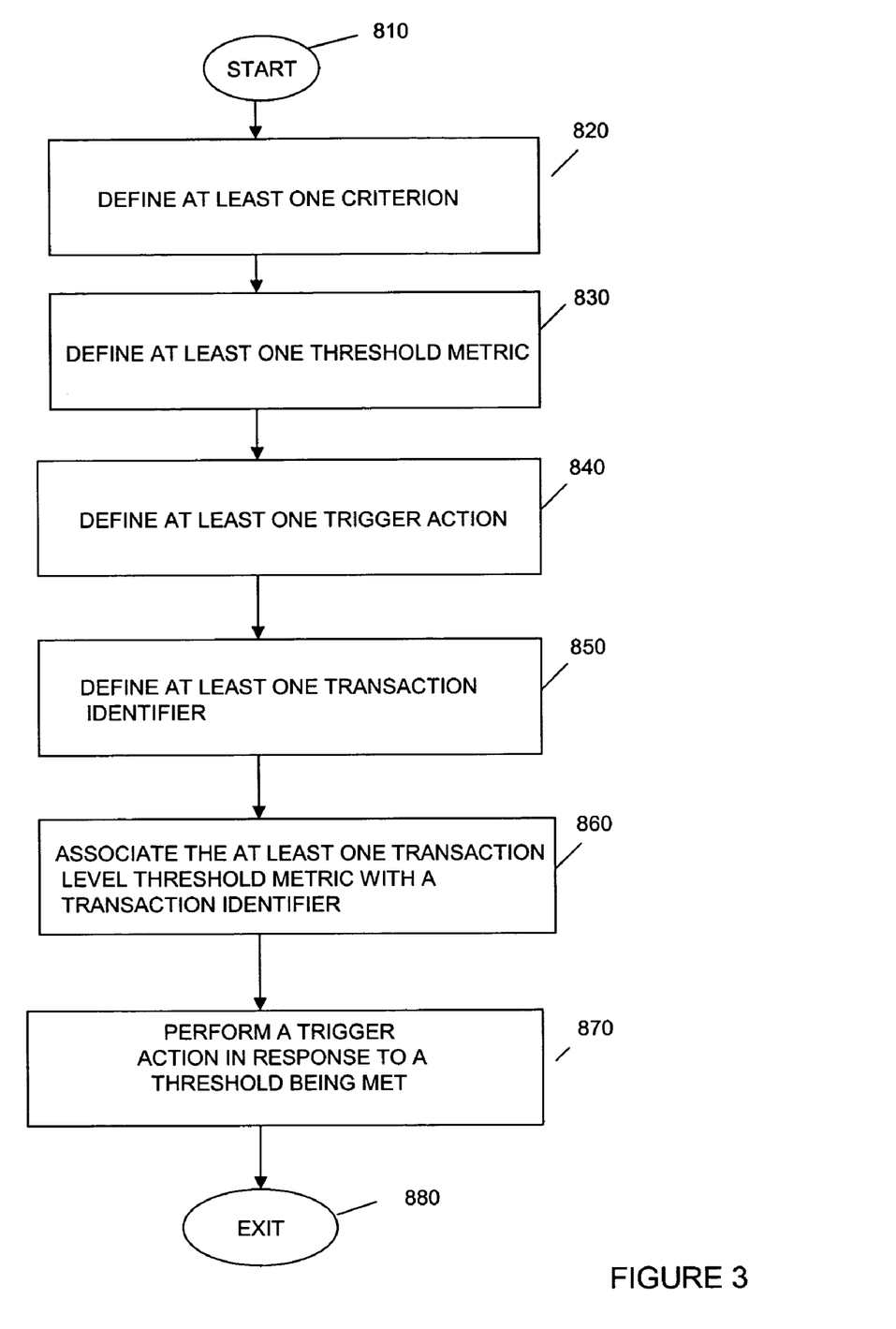
FIG. 3 is a flow diagram showing an embodiment of using an aspect of the invention.

FIGS. 2A-3 are flow diagrams of an embodiment showing steps of using the invention. FIGS. 2A-3 may equally represent a high-level block diagram of components of the invention implementing the steps thereof. The steps of FIGS. 2A-3 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. FIGS. 2A-3 may be implemented, for example, using the components of FIG. 1.

Referring to FIGS. 2A-2E, upon activation of the facility, at step 200, the runtime parameters 210 of the facility (which may be maintained in a file or database, or may be hard coded or hardwired into the invention itself) are loaded at step 220 and validated at step 230. Depending upon the results of validation step 230, a check is made at step 240 to determine whether processing should continue, based upon the qualification criteria present in the embodiment of the invention. Should validation fail, the facility terminates at step 270. After step 250 successfully completes initialization of the facility, the system enters a nominal mode of processing at step 260, which may be regulated in intervals.

Continuing with FIG. 2B, upon the start of a nominal processing cycle at step 310, the frequency may be governed by an interval controller 380, discussed below. At step 320, the facility collects data regarding the present or current workload characteristics, status, or "health", of the transaction processing system. The facility accesses a pre-provided list of characteristics 330 for which data is to be collected. Examples of the source of this data may include the facility's runtime parameters 210 or the storage mechanism used to maintain the interval criterion (e.g., 420) which may be a database, for example. For each characteristic of the transaction processing system or hosting server for which data may be collected, there may be a method to collect such data, such as dedicated routines and/or registry for collecting the data. Examples of where this logic resides include integrated routines 340, typically within the facility itself, as distinct separate executable logic 350 or definitions interpretable by the facility 360. This process continues until, at step 370, it is determined that there are no further collection points for which to collect data.

Once a list of all relevant system metrics is collected and made available, the facility is prepared to begin evaluation of the interval criterion. In embodiments, the invention may perform three levels of dynamic administration:

1. System Level—Dynamic actions based upon system-level health characteristics.
2. Transaction Level—Dynamic actions based upon transaction-specific characteristics.
3. Multi-Transaction Level—Dynamic administrative actions based upon the aggregate characteristics of the current transaction mix executing on a server.

Continuing with FIG. 2C, at step 410, system-level criterion is evaluated from the interval criterion data source 420. The system-level evaluation step 410 may be performed directly against the data gathered at step 320. At step 430, a check is made whether the evaluation results in a required action. If not, at step 440, the facility determines if there are more system-level evaluations to be performed. If there are more system-level evaluations, the process continues at step 410 with the next evaluation. Otherwise the facility proceeds to the next series of evaluations. Should the result at step 430 be positive (i.e., requiring action), the action defined by the interval criterion data source 420 is carried out at step 450, using the logic of the interval criterion actions 460, which is associated with the interval criterion that was evaluated at step 410, and may be executed within the software of the facility itself.

In other embodiments the action defined in 460 may be provided through other mechanisms, such as sending messages to other entities to perform an action. Examples of such an action include informing a peer server that the triggering server is now available to accept work, alerting a remote operator of an anomalous condition, or triggering a diagnostic trace on a Storage Area Network unit. After the triggered action is carried out (or instigated) at step 450, the process proceeds to step 440 to determine if there are more system evaluations.

System-level criterion evaluations deal with characteristics of the system, which may be the transaction processing system of the host server. By way of example, a representation of a system-level criterion tree based on the present/current state of "SYSTEM MEMORY UTILIZATION" would be:

A—If SYSTEM MEMORY UTILIZATION exceeds 60%, then perform action SLSMU_1.
B—If SYSTEM MEMORY UTILIZATION exceeds 80%, then perform action SLSMU_2.
C—If SYSTEM MEMORY UTILIZATION exceeds 90%, then perform action SLSMU_3.
D—If SYSTEM MEMORY UTILIZATION exceeds 95%, then perform action SLSMU_4.

For each action identifier (e.g., SLSMU_1, SLSMU_2, etc) there is an associated action defined in the interval criteria actions 460. One of ordinary skill in the art should recognize that any number of action identifiers may exist, as necessary.

Continuing with FIG. 2D, transaction-level criterion evaluation may be performed starting at step 500 where the facility acquires a list of currently executing transactions from the transaction processing system, which may in embodiments, be a list of currently executing transactions stored for reference in a Stored Transaction List 590. At step 510, for each transaction on the list, a series of relevant details is collected or obtained. At step 520, transaction level evaluation is performed against the data collected in step 510 using interval criterion matrix 530.

At step 540, a determination is made whether any action is necessary based upon the evaluation at step 520. If no action is required (e.g. negative evaluation), at step 570, the facility determines if there are more transaction-level evaluations to be performed and if so, the process continues with the next evaluation at step 520. Should the result of step 540 require action (e.g. be positive) then, at step 550, action defined by the interval criterion data source 560 is carried out. This action may be carried out within the software of the facility, itself, or may alternatively cause action to be triggered and carried out by another system component. After the triggered action is carried out at step 550, at step 570, the process proceeds to the next transaction-level evaluation check. When there are no further transaction-level evaluations remaining to be performed at step 570, at step 580, the facility determines whether any transactions remain for processing. If so, the next transaction on the list 590 is selected, and processing continues at step 510.

In one implementation and referring to Table 1 and the flow of FIGS. 2A-2E, transaction-level criterion evaluations deal with the characteristics of individual transactions relative to the present/current characteristics of the overall system, be it the transaction processing system or a host server. An example representation of a transaction-level criterion matrix is given in TABLE 1. The first element of this matrix is System Level Metric 601, which may be obtained in step 320 (FIG. 2B). The matrixes second element is Transaction Identifier 602.

The transaction processing system may identify transactions via 4-byte alphanumeric identifiers (or other identification technique). The asterisk in the example Transaction Identifiers 602 in Table 1 indicates a 'wild card', these Transaction Level Criterion affect only transactions that have identifiers starting with "AA". Use of Transaction Identifier 602 in this example illustrates that Transaction Level Criterion do not necessarily need to affect all transactions on a transaction processing system, and may be selectively qualified via any convenient mode of unique identification for a given subset of transactions. The Transaction Level Metric 603 indicates which present characteristic of the transaction to evaluate and the value to evaluate said characteristic against, should the condition listed under System Level Metric 601 be met. For conditions that match criterion System Level Metric 601, Transaction Identifier 602, and Transaction Level Metric 603, the Facility Action 604 is triggered. For clarity within this example, the actions to be invoked under Facility Action 604 are described in plain text. In other embodiments, the Facility Action 604 may be carried on the Transaction Level Criterion Matrix 530 as an identifier referencing a logical process that may be embodied in a form executable by the facility, illustrated as Interval Criterion Actions 560 (FIG. 2D).

Multi-transaction criterion evaluations deal with the characteristics of groups of transactions relative to the overall system's present/current characteristics. These evaluations are similar to transaction level criterion evaluation, with the added concept of "transaction groups", which may be built and administered by an administrator or pre-built and obtained from an electronic source. Examples of such transaction groups are provided in TABLE 2.

TABLE 2

Example Multi-Transaction-Level Criterion Matrix

| | 801 System Level Metric | 802 Transaction Grouping Method | 803 Transaction Group Level Metric | 804 Facility Action |
|---|---|---|---|---|
| 1 | None | Transactions from the same IP SubNet | Count of transactions in group exceeds 10 | Block further transactions from that IP SubNet |
| 2 | Current Task Count is in the 70%-80% range of the Maximum Tasks Allowed | Transactions executing search functions | Transaction Group accounts for greater than 50% of current transactions | Terminate transactions within this transaction group |
| 3 | Current Task Count is in the 80%-100% range of the Maximum Tasks Allowed | Transactions executing search functions | Transaction Group accounts for greater than 50% of current transactions | Terminate transactions within this transaction group |
| 4 | Current Task Count is in the 90%-100% range of the Maximum Tasks Allowed | Transactions routed from the same server | Transaction Group accounts for greater than 25% of current transactions | Cease accepting transactions from the server & request server to cease forwarding transactions to this server |

The concept of transaction groups permits aggregated accounting of transactions over similar or related entities (e.g., same server, search functions, etc.) or common identifier (e.g., IP subnet, transmission medium, etc.) and applying a transaction group level metric to the aggregated entities. This is illustrated by way of example, by referring to FIG. 2E, at step 700 the facility acquires a list of aggregate transaction groups from the Interval Criterion tables 790 which defines aggregations of related transaction types or characteristics.

At step 710, for each aggregate transaction group, a series of relevant details is collected, optionally referencing the Stored Transaction List 590 for efficiency reasons. At step 720, transaction-group level evaluation is performed against the data collected at step 710 using interval criterion 730 (e.g., Table 2). At step 740, a determination is made whether action is necessary. Should no action be required (e.g., the result is negative), at step 770, the facility determines if there are more transaction-group level evaluations to be performed. If there are more transaction-group level evaluations, the process continues with the next evaluation at step 720. Should the result of step 740 determine that action is required (e.g., be positive) then at step 750, the action defined by the interval criterion data source 760 is carried out. The logic of the action, which is associated with the interval criterion that was qualified at step 730 may be carried out within the software of the facility itself. In other embodiments the action logic may trigger action by other components.

After the triggered action is carried out at step 750, the process proceeds to the next transaction-group level evaluation check at step 770. When, at step 770, there are no further transaction-group level evaluations remaining to be performed, at step 780, the facility determines if any transactions-group evaluations remain for processing. If so, the next transaction-group evaluation on the list 590 is selected, and processing continues at step 710.

Otherwise, processing proceeds to an Interval Controller 380 that, in this embodiment, halts processing for a set period of time, for example sixty seconds, before allowing processing to continue. Other time intervals may be chosen based on circumstances. In a further aspect, the Interval Controller acts upon variable timers which may change based upon the results of prior scan cycles. In yet another aspect, the Interval Controller may resume processing based upon one or more system characteristics, such as when average processor utilization is greater than 75%, or, when the number of connections to this transaction processing system exceed 2000 (or other parametric criterion). Alternatively, the Interval Controller may be substantially absent or by-passed, with implies continuous processing of the invention.

Referring again to Table 2, the first element of this matrix is System Level Metric 801, which may be obtained previously at step 320 (FIG. 2B). The matrixes second element is Transaction Grouping Method 802. For clarity within this example the Transaction Grouping Method 802 is described in plain text. In other embodiments, the Transaction Grouping Method 802 may be carried on the Transaction Level Criterion Matrix 730 as an identifier referencing a logical process that would be embodied in a form executable by the facility, illustrated as Interval Criterion Actions 760 (FIG. 2F). The Transaction Group Level Metric 803 indicates which present characteristic of the transaction group to evaluate and the value to evaluate the characteristic against, should the condition listed under System Level Metric 801 be met. For conditions that match criterion System Level Metric 801, Transaction Grouping Method 802, and Transaction Group Level Metric 803, the Facility Action 804 is triggered. For clarity within this example, the actions to be invoked under Facility Action 804 are described in plain text. In other embodiments the Facility Action 804 may be carried on the Transaction Level Criterion Matrix 530 as an identifier referencing a logical process that would be embodied in a form executable by the facility, illustrated as Interval Criterion Actions 560 (FIG. 2D).

FIG. 3 is a flow diagram showing an embodiment of using an aspect of the invention beginning at step 810. At step 820, at least one criterion of a workload characteristic of the transaction processing system is defined. At step 830, at least one threshold metric for each criterion is defined (these may be system level and/or transaction level metrics). At step 840, at least one trigger action is defined to be executed in response to the at least one threshold metric being met. At step 850, at least one transaction identifier identifying subsets of transactions is defined. At step 860, the at least one transactional level threshold metric is associated with the at least one transaction identifier. In one aspect, a step may occur to check and determine when a threshold metric (or metrics) is met. At step 870, at least one trigger action is performed in response to the at least one threshold metric being met. The process then exists at step 880.

Using the invention, greatly focused and much improved control of a transaction processing system is achievable. Individual transactions may be acted upon when abnormal circumstances demand action instead of performing system-wide or more global action. The invention provides for the ability to deliver substantially improved autonomic administration of transaction and system level functions via consideration of any number and degree of workload characteristics in the decision making process. Better system performance results. Further, since the services provided in accordance with the invention occur during real-time system processing, system administrators have improved ability to more accurately control specific deficiencies in system performance and develop criterion to overcome those deficiencies.

Other embodiments of the invention may include or exclude particular transactions from consideration under a given interval criterion entry. Still other embodiments of the system may allow for evaluation of system-level criterion only, without regard to transaction-level evaluations. Yet in other embodiments, the invention allows for the converse, transaction-level criterion evaluation without system-level criterion evaluation. An example implementation of either of these would be the support of a 'null' evaluation for either criterion column.

Yet another embodiment of the invention allows for the evaluation of groups of transactions. An example of this includes evaluation of an aggregate of a transaction-level metric data gathered from a logical grouping of transactions. An example of where a reference to such grouping logic would be carried is on a column upon the interval criterion data source. This may include, for example, classes of preferred users that might have less stringent controls, or certain transactions that are exempt from certain criteria.

The facility may execute at set time (i.e., predefined) increments within an embodiment of the invention. One of ordinary skill in the art may choose to establish other techniques of triggering the invocation of the facility which embodies the invention. Further, a straightforward manner of specifying and recording the desired system behaviors that form the basis of the invention's decision tree is a useful and flexible feature of the invention.

The action to be taken by the invention, as referenced by the interval criterion data source, may act against a given transaction, other transactions or some other aspect of the hosting transaction processing system or another transaction processing system. An example of the invention acting upon the given transaction is the purging or quiescing of the transaction. An example of the invention acting upon another transaction is the purging or quiescing of other transactions to allow a more important transaction to have preferred access to constrained resources. Examples of the invention acting upon other aspects of the transaction processing system include suspending new transactions from entering the system, disallowing transactions from a given source, quiescing the system and triggering routing of transactions to a different transaction processing system. An example of the invention action upon another transaction processing system is the triggering of another transaction processing system to cease forwarding transactions to the host transaction processing system. Terminating a process may also occur.

While the invention has been described in terms of embodiments, those skilled in the art will recognize that the invention can be practiced with modifications and in the spirit and scope of the appended claims.

What is claimed is:

1. A method for managing a transaction processing system, the method comprising:
 defining at least one criterion including all of: a system level criterion, a transaction level criterion, a multi-transactional level criterion, and a workload characteristic, using a server;
 defining at least one threshold metric for each of the at least one criterion using the server;
 defining at least one trigger action in response to the at least one threshold metric using the server;
 performing the at least one trigger action in response to the at least one threshold metric being met using the server;
 implementing an interval criterion matrix using the server, wherein the interval criterion matrix is a source of configurable data and is created by an administrator or accessed from a pre- built electronic source;
 acquiring a transaction list of currently executing transactions;
 collecting details for each of the currently executing transactions;
 evaluating transaction details against the interval criterion matrix which further defines thresholds associated with the currently executing transactions; and
 performing actions when the evaluation step determines a threshold has been met.

2. The method of claim 1, wherein the defining at least one trigger action step includes defining at least one of a system level trigger action and a transaction level trigger action.

3. The method of claim 1, wherein the at least one criterion includes at least one of a processor utilization characteristic, memory utilization characteristic, an input/output characteristic, a storage characteristic, and a network interface characteristic.

4. The method of claim 1, wherein defining at least one threshold metric includes defining at least one of a single and a progressive variable relative to a measurement of an aspect of the transaction processing system.

5. The method of claim 1, further including repeating each of the steps at predefined intervals.

6. The method of claim 1, wherein the at least one trigger action includes at least one of changing the priority of a transaction, terminating a transaction, delaying a transaction, quiescing a transaction, causing another system to stop forwarding transactions, triggering routing of transactions to a different system, and ending a process.

7. The method of claim 1, further comprising:
 defining at least one transaction identifier that identifies subsets of transactions; and
 defining at least one transaction level threshold metric associated with the at least one transaction identifier.

8. The method of claim 7, wherein the performing step performs the at least one trigger action on a transaction associated with the at least one transaction identifier.

9. The method of claim 8, wherein the performing step performs when the at least one transaction level threshold metric is met.

10. The method of claim 7, further comprising:
 defining a system level threshold metric; and
 associating the system level threshold metric with the at least one transaction identifier and with the at least one transaction level threshold metric.

11. The method of claim 10, wherein the performing step is only performed when both the system level threshold metric and the transaction level threshold metric are met.

12. The method of claim 7, wherein the defining at least one transaction identifier includes defining a transaction group identifier.

13. The method of claim 1, wherein the defining at least one threshold metric defines a transaction group level metric.

14. The method of claim 1, further comprising the steps of:
loading runtime parameters;
validating the runtime parameters; and
terminating processing if the parameters are deemed unacceptable.

15. The method of claim 1, further comprising:
acquiring a list of aggregate transaction groups;
collecting details for each aggregate transaction group;
evaluating each aggregated transaction group details against the interval criterion matrix which further defines thresholds associated with each aggregated transaction group; and
performing actions when the evaluation step determines a threshold has been met.

16. The method of claim 15, wherein each aggregated transaction group is built and administered by an administrator.

17. The method of claim 16, wherein each aggregated transaction group is pre-built and obtained from an electronic source.

18. The method of claim 1, further comprising collecting data on the status of the transaction processing system, wherein the collecting is performed by one of executable collection logic and interpretable definitions.

19. The method of claim 1, wherein the workload characteristic is in a pre-provided list of characteristics configured to be assessed by a facility.

20. The method of claim 19, wherein the facility is a software extension of the transaction processing system.

21. The method of claim 1, wherein the system level criterion is dynamically evaluated based upon system-level health characteristics.

22. The method of claim 21, wherein the transactional level criterion is dynamically evaluated based upon transaction-specific characteristics.

23. The method of claim 22, wherein the multi-transactional level criterion is dynamically evaluated based upon transaction-specific characteristics.

24. The method of claim 1, further comprising:
evaluating the system level criterion from an interval criterion data source;
checking whether the system level criterion evaluation results in a required action;
determining whether there are additional system level criterion evaluations to be performed; and
carrying out the required action, which is defined by the interval criterion data source, using logic of an interval criterion action.

25. The method of claim 24, wherein the interval criterion action includes informing a peer server that a triggering server is available to accept work, alerting a remote operator of an anomalous condition, or triggering a diagnostic trace on a storage area network unit.

26. The method of claim 25, further comprising:
using an interval controller to halt processing for a set period of time, act upon various timers which change based upon results of scan cycles, and resume processing based upon one or more system characteristics.

27. A method of managing a system, comprising the steps of:
determining current conditions of a workload characteristic using a server;
evaluating the current conditions of the workload characteristic using the server;
dynamically adjusting system administration criteria based on a threshold metric associated with the current conditions of the workload characteristic using the server;
implementing an interval criterion matrix using the server, wherein the interval criterion matrix is a source of configurable data and is created by an administrator or accessed from a pre-built electronic source;
defining a system level threshold metric associated with the workload characteristic;
defining at least one transaction identifier that identifies subsets of transactions;
defining at least one transaction level threshold metric associated with the at least one transaction identifier and a transaction workload characteristic; and
associating the system level threshold metric with the at least one transaction identifier and with the at least one transaction level threshold metric,
wherein the dynamically adjusting step is only performed when both the system level threshold metric and the transaction level threshold metric are met.

28. The method of claim 27, wherein the workload characteristic is at least one of a transaction workload characteristic and a system environment workload characteristic.

29. The method of claim 27, wherein the workload characteristic is a transaction processing system characteristic.

30. The method of claim 27, wherein the adjusting includes at least one of changing the priority of a transaction, terminating a transaction, delaying a transaction, quiescing a transaction, causing another system from forwarding transactions, triggering routing of transactions to a different system, and ending a process.

31. The method of claim 27, wherein the dynamically adjusting step is only performed when at least one of the system level threshold metric and the transaction level threshold metric is met.

32. A computer system for managing a transaction processing system, the computer system comprising:
a means for defining at least one criterion including all of: a system level criterion, a transaction level criterion, a multi-transactional level criterion, and a workload characteristic of the transaction processing system;
a means for defining at least one threshold metric for each of the at least one criterion;
a means for defining at least one trigger action in response to the at least one threshold metric;
a means for implementing an interval criterion matrix, which is a source of configurable data and is created by an administrator or accessed from a pre-built electronic source;
a means for acquiring a transaction list of currently executing transactions;
a means for collecting details for each of the currently executing transactions;
a means for evaluating transaction details against the interval criterion matrix wherein the interval criterion matrix further defines thresholds associated with the currently executing transactions; and
a means for performing threshold actions when the evaluation step determines a threshold has been met.

33. A computer system of claim 32, further comprising:
- a means for defining at least one transaction identifier that identifies subsets of transactions;
- a means for defining at least one transaction level threshold metric associated with the at least one transaction identifier;
- a means for defining a system level threshold metric; and
- a means for associating the system level threshold metric with the at least one transaction identifier and with the at least one transaction level threshold metric.

34. A computer system of claim 32, further comprising:
- a means for loading runtime parameters;
- a means for validating the runtime parameters; and
- a means for terminating processing if the parameters are deemed unacceptable.

35. A computer system of claim 32, further comprising a criterion matrix, wherein the criterion matrix comprises:
- a system level metric entry that provides a system level threshold for a system level workload characteristic;
- a transaction identifier entry that provides an identification for one of a transaction and a transaction group;
- a transaction level metric entry that provides a transaction level threshold for transaction type defined by the transaction identifier; and
- a facility action entry for identifying logic to be executed if at least one of the system level threshold and the transaction level threshold is met.

36. A computer system of claim 32, further comprising a means for performing the at least one trigger action in response to the at least one threshold metric being met.

37. A computer system for managing a transaction processing system comprising computer program code stored on a storage media, the computer system comprising:
- a means for determining current conditions of at least a workload characteristic;
- a means for evaluating the current conditions of at least the workload characteristic;
- a means for dynamically adjusting system administration criteria based on a threshold metric associated with the current conditions of at least the workload characteristic;
- a means for implementing an interval criterion matrix, which is a source of configurable data and is created by an administrator or accessed from a pre-built electronic source,
- a means for defining a system level threshold metric associated with the workload characteristic;
- a means for defining at least one transaction identifier that identifies subsets of transactions;
- a means for defining at least one transaction level threshold metric associated with the at least one transaction identifier and a transaction workload characteristic; and
- a means for associating the system level threshold metric with the at least one transaction identifier and with the at least one transaction level threshold metric,
- wherein the means for dynamically adjusting adjusts the system administration criteria when both the system level threshold metric and the transaction level threshold metric are met.

38. The computer system of claim 37, wherein the at least one workload characteristic is at least one of a transaction workload characteristic and a system environment workload characteristic.

39. The computer system of claim 37, wherein the at least one workload characteristic is a transaction processing system characteristic.

40. The computer system of claim 37, wherein the means for dynamically adjusting provides for at least one of changing the priority of a transaction, terminating a transaction, delaying a transaction, quiescing a transaction, causing another system to stop forwarding transactions, triggering routing of transactions to a different system, and ending a process.

41. The computer system of claim 37, wherein the means for dynamically adjusting provides for only adjusting when at least one of the system level threshold metric and the transaction level threshold metric is met.

42. A computer program product comprising computer program code stored on a storage medium, the computer program product includes:
- a first computer code to define at least one criterion including all of: a system level criterion, a transaction level criterion, a multi-transactional level criterion, and a workload characteristic of the transaction processing system;
- a second computer code to define at least one threshold metric for each of the at least one criterion;
- a third computer code to define at least one trigger action in response to the at least one threshold metric;
- a fourth computer code to perform the at least one trigger action in response to the at least one threshold metric being met; and
- a fifth computer code to implement an interval criterion matrix, which is a source of configurable data and is created by an administrator or accessed from a pre-built electronic source
- wherein the computer program product includes further computer code to:
  - define at least one transaction identifier that identifies subsets of transactions;
  - define at least one transaction level threshold metric associated with the at least one transaction identifier;
  - define a system level threshold metric; and
  - associate the system level threshold metric with the at least one transaction identifier and with the at least one transaction level threshold metric,
- wherein the performing step is only performed when both the system level threshold metric and the transaction level threshold metric are met.

* * * * *